United States Patent [19]

Kijima et al.

[11] Patent Number: 5,057,864
[45] Date of Patent: Oct. 15, 1991

[54] APPARATUS FOR CONTROLLING THE QUANTITY OF LIGHT OF A COPYING APPARATUS

[75] Inventors: Hiromitsu Kijima, Ageo; Susumu Usami; Masatoshi Ishiwata, both of Tokyo, all of Japan

[73] Assignee: Kabushiki Kaisha TOPCON, Japan

[21] Appl. No.: 627,306

[22] Filed: Dec. 14, 1990

[30] Foreign Application Priority Data

Dec. 15, 1989 [JP] Japan .................................. 1-325438

[51] Int. Cl.⁵ .............................................. G03B 27/72
[52] U.S. Cl. ......................................... 355/71; 355/228
[58] Field of Search ....................... 355/71, 27, 67, 228

[56] References Cited

U.S. PATENT DOCUMENTS

| | | | |
|---|---|---|---|
| 3,334,542 | 8/1967 | Wenthe et al. | 355/67 |
| 3,981,577 | 9/1976 | Tsilibes | 355/71 |
| 4,072,413 | 2/1978 | Amess | 355/67 |
| 4,080,057 | 3/1978 | Nakane et al. | 355/71 |
| 4,090,788 | 5/1978 | Massengeil | 355/71 |
| 4,113,379 | 9/1978 | Harada et al. | 355/71 |
| 4,194,835 | 3/1980 | Shiode | 355/67 |
| 4,716,442 | 12/1987 | Yazaka | 355/67 |

*Primary Examiner*—Monroe H. Hayes
*Attorney, Agent, or Firm*—Mason, Fenwick & Lawrence

[57] ABSTRACT

The present invention relates to an apparatus for controlling the quantity of light of a copying apparatus, and more particularly, to an apparatus for controlling the quantity of light to uniformalize the quantity of central light and the quantity of marginal light in a variable power type copying apparatus. The apparatus for controlling the quantity of light of a variable power type copying apparatus has a douser i.e. a light interrupting plate for controlling the quantity of marginal light can be automatically inserted into the projection optical system interlocking with the variable power operation.

1 Claim, 3 Drawing Sheets

APPARATUS FOR CONTROLLING THE QUANTITY OF LIGHT OF A COPYING APPARATUS

BACKGROUND OF THE INVENTION

The present invention relates to an apparatus for controlling the quantity of light of a copying apparatus, and more particularly, to an apparatus for controlling the quantity of light to uniformalize the quantity of central light and the quantity of marginal light in a variable power type copying apparatus.

A projection optical system of the copying apparatus has a large angle of view and therefore the quantity of marginal light is usually insufficient. This problem has been solved by increasing the quantity of marginal light and by uniformalizing the brightness of the image plane with the use of an insertable diaphragm or a stop for controlling the quantity of light which is provided with a complicated driving apparatus.

The problem of lack of quantity of marginal light is also found in the variable power type copying apparatus. For example, when uniformalizing the brightness of the image plane by compensating the lack of the quantity of marginal light at a high magnification side according to the method above, it sometimes causes an excess of the quantity of marginal light at a low magnification side and fails to uniformalize the brightness of the image plane.

For correcting the excess of the quantity of marginal light, it is a conventional manner to manually insert a diaphragm member or a stop member for interrupting a part of the quantity of marginal light into the projection optical system. However the inserting operation of the diaphragm member is troublesome and is liable to be forgotten.

SUMMARY OF THE INVENTION

It is an object of the present invention to provide an apparatus for controlling the quantity of light of a variable power type copying apparatus wherein a douser (i.e. a light interrupting plate) for controlling the quantity of marginal light can be automatically inserted into the projection optical system with interlocking with the variable power operation.

It is another object of the present invention to provide an apparatus for controlling the quantity of light of a variable power type copying apparatus which does not have any adverse effect on the variable power optical system even if the structural element (e.g. the douser) of the apparatus would be abruptly moved into an undesired position due to shock, vibration or inclination thereof, for example, during its transportation and which can be returned to its correct position by continuing the usual operation thereof.

The objects of the present invention can be achieved, according to the present invention, by an apparatus for uniformalize the quantity of light of a copying apparatus wherein the magnification of projection can be varied by the motion of a projection lens comprising; a driving member mounted integrally on said projection lens; a base plate forming a part of a body of said copying apparatus; a douser supported on said base plate around a pivotal shaft arranged at a position offset from an optical axis of said projection lens and orthogonally intersecting the optical axis; a first tab adapted to be engaged with said driving member when said driving member is moved toward said douser located in a light non-interruption position and a second tab adapted to be engaged with said driving member when said driving member is moved toward said douser located in a light interruption position, said tabs being formed integrally with said douser on an opposite side of said pivotal shaft of said douser from a side on which light interrupting projections are formed; a tension spring one end of which is secured on one of said light interrupting projections of said douser and the other end of which is secured on said base plate at a position substantially opposite of said pivotal shaft of said douser from the mid point of the swing angle of said douser; a positioning portion formed on said base plate adapted to be abutted by said tension spring for holding said douser at said light interruption position; a positioning portion formed on said base plate adapted to be abutted by said tension spring for holding said douser at said non-light interruption position; and said tab projecting from said side of said douser by a height so that said driving member cannot engage the tab when said douser is swung slightly beyond said light interruption position and said second tab projecting from said side of said douser by a height so that said driving member cannot engage the second tab when said douser is returned slightly beyond said non-light interruption position.

BRIEF DESCRIPTION OF THE DRAWINGS

Other objects and advantages of the present invention will become apparent from the following detailed description of a preferred embodiment of the present invention taken in reference to the accompanying drawings in which.

DESCRIPTION OF THE PREFERRED EMBODIMENT

Figure 1:
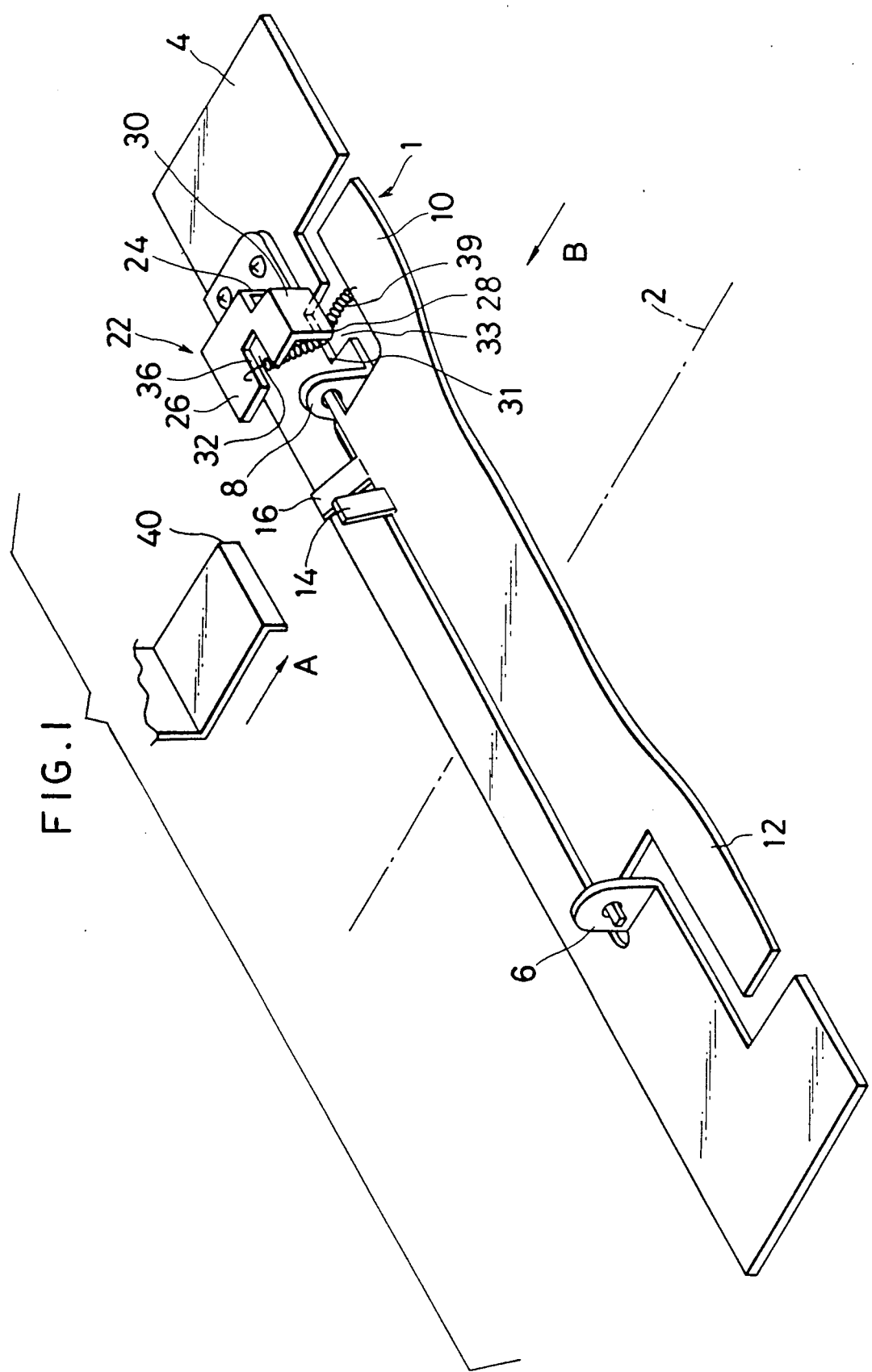
FIG. 1 is a perspective view showing an embodiment of an apparatus for uniformalizing the quantity of light of a variable power type copying apparatus of the present invention.

As shown in FIG. 1 a light interrupting plate i.e. douser 1 is arranged above an optical axis 2 of a projection lens (not shown) of a copying apparatus (not shown) and is supported by supporting members 6 and 8 upstanding from a base plate 4 which is integral with a body of the copying apparatus. The rotational axis of the douser 1 defined by the supporting members 6 and 8 orthogonally intersects the optical axis 2.

Figure 2:
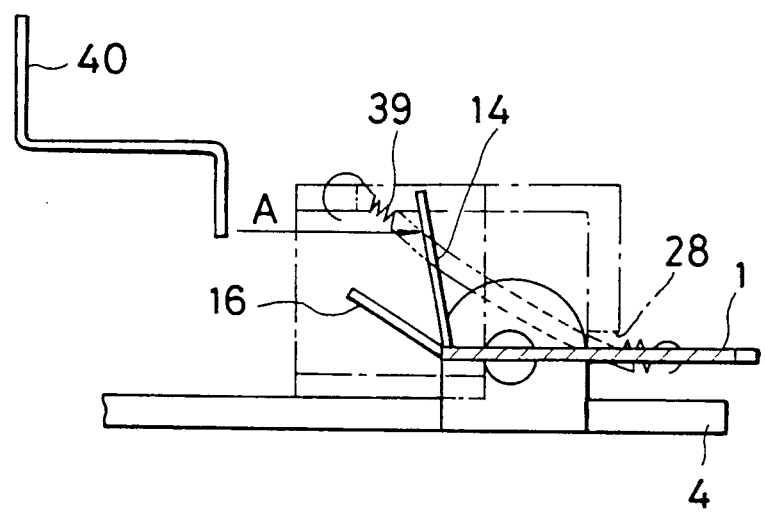
FIG. 2 is a schematic view for explanation of the operation of the apparatus of FIG. 1 showing a normal operation to switch a douser to a low magnification projection position.

In usual the douser 1 is swingably driven between a horizontal non-light interruption position of FIG. 1 and a vertically suspended light interruption position of FIG. 2. However the douser 1 can be further forced to temporary positions slightly beyond both the horizontal light non-interruption position and the vertical light interruption position when carrying out a correcting operation of the douser 1 which will be hereinafter explained in more detail. These temporary positions of the douser 1 are shown respectively in FIGS. 4 and 5. In the vertical light interruption position two projected portions 10 and 12 laterally projected from both ends of the douser 1 at a bottom edge (i.e. a front edge when viewed in the horizontal position of FIG. 1) thereof are adapted to partially interrupt both side portions of a luminous flux (not shown) having a flattened crosssection.

Tabs 14 and 16 are arranged at the other edge (i.e. a rear edge viewed in FIG. 1) of the douser 1 opposite to the front edge in which the projected portions 10 and 12 are arranged. The tab 14 is upwardly inclined at about 80° relative to the douser 1 located in its horizontal position and the tab 16 is also upwardly inclined at about 30°. The tab 14 can be engaged by a driving member 40 mounted on an operation member of the variable power mechanism (not shown) and drives the douser 1 to its vertical light interruption position when the tab 14 is driven by the driving member 40 during the forward motion (an arrow A in FIG. 1) of the driving member 40. On the other hand, the tab 16 can be engaged by the driving member 40 and returns the douser 1 to its horizontal non-light interruption position when the tab 16 is driven by the driving member 40 during the rearward motion (an arrow B in FIG. 1) of the driving member 40. The functions of these tabs 14 and 16 will be hereinafter explained in more detail.

Adjacent to either one of the supporting members 6 and 8 there is provided with a spring holder 22. The spring holder 22 has a vertical portion 24 upstanding substantially in parallel with the optical axis 2 from the base plate 4 to a position slightly higher than the pivotal support center of the supporting members 6 and 8, a horizontal portion 26 horizontally extending from the top edge of the vertical portion 24 toward one of the supporting members 6 and 8 (the supporting member 8 in the illustrated embodiment), and a vertical wall 30 downwardly extending from the forward edge of the horizontal portion 26 to a position substantially the same height as the pivotal shaft of the supporting members 6 and 8. The bottom edge 28 of the vertical wall 30 forms an abutment or a stopper of a tension spring 39 for positioning the spring 39 (and accordingly the douser 1) at the non-light interruption position which will be hereinafter explained in more detail.

A notch 32 is formed in the horizontal portion 26 and the rear edge 36 of the notch 32 is positioned so that a line passing through the rear edge 36 and the bottom edge 28 of the vertical wall 30 makes an angle about 45° relative to the surface of the base plate 4. One end of the tension spring 39 is secured on the rear edge of the notch 32 and the other end thereof is secured on the the douser 1 at position offset from the pivotal center of the douser 1.

An another notch 33 is formed in the base plate 4 below the horizontal portion 26. The rear edge 31 of the notch 33 is located at a position substantially vertically below the pivotal center of the douser 1 and forms an abutment or a stopper of the spring 39 for positioning the spring 39 (and accordingly the douser 1) at the light interruption position.

The apparatus of the present invention will be operated as follows. When the driving member 40 is in a position shown in FIGS. 1 and 2 the projection optical system of the copying apparatus is in a high magnification mode and thus the douser 1 does not interrupt any portion of the projection optical system. That is, the douser 1 is in a condition switched to the non-light interruption position. This condition of the douser 1 is maintained by the tensioning force of the spring 39 which is now held in an abutted condition against the bottom edge 28 of the vertical wall 30.

When the projection optical system is then switched to a low magnification mode the driving member 40 is moved forwardly along the arrow A in FIGS. 1 and 2. The driving member 40 engages the tab 14 and pushes the tab 14 forward. Accordingly the douser 1 is switched to the light interruption position (FIG. 3) and is inserted into the projection optical system and orthogonally intersects the optical axis 2. This condition of the douser 1 is maintained by the tensioning force of the spring 39 which is now held in an abutted condition against the rear edge 31 of the notch 33.

Figure 3:
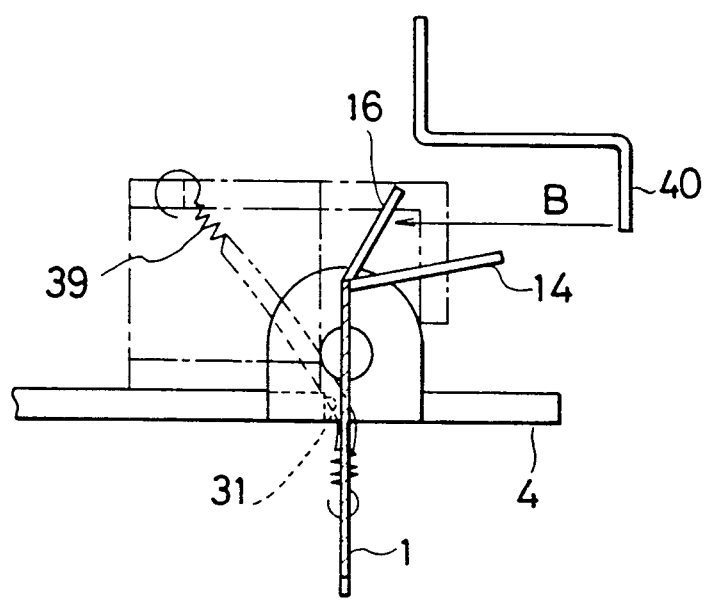
FIG. 3 is a schematic view for explanation of the operation of the apparatus of FIG. 1 showing a normal operation to switch a douser to a high magnification projection position.

Then when the projection optical system is switched to the high magnification mode the driving member 40 is returned rearwardly along the arrow B in FIGS. 1 and 3. During this returning motion of the driving member 40 it engages the tab 16 and pushes the tab 16 rearward. Thus the douser 1 is returned to the non-light interruption position (FIG. 1). In this condition the spring 39 is abutted against the bottom edge 28 of the vertical wall 30 again and maintains the douser 1 in the non-light interruption position.

Figure 4:
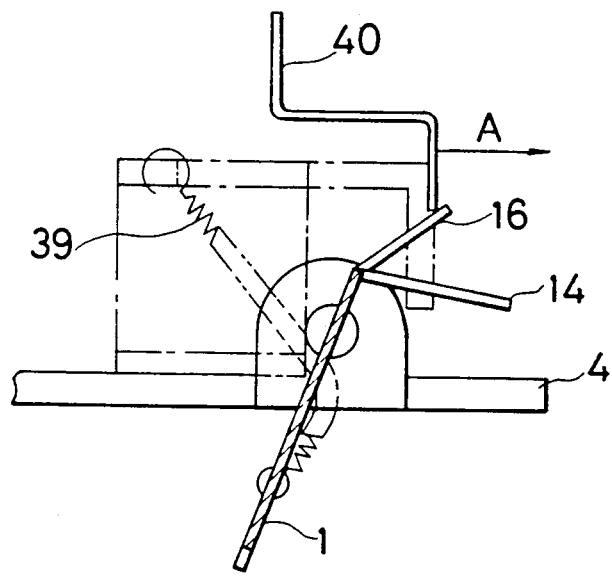
FIG. 4 is a schematic view for explanation of the operation of the apparatus of FIG. 1 showing a correcting operation of a douser to a low magnification projection position.

Finally correcting operation of the douser 1 which has been moved to an unwanted position will be explained. Under the condition that the projection optical system is selected to the high magnification mode, if the douser 1 would be moved to the light interruption mode (i.e. the low magnification mode), for example, by shock or vibration during transportation, the direction of the douser 1 must be corrected. The operation required for this correction is only to move the driving member 40 forward along the direction of the arrow A. That is, when the driving member 40 is moved forward, as shown in FIG. 4, it engages the tab 16 and pushes it forward. Accordingly the douser 1 is pivoted to a position slightly beyond the vertical light interruption position against the tension of the spring 39 and the driving member 40 passes over the tab 16. The driving member 40 is thus disengaged from the tab 16 and assumes its normal low magnification position. Then by returning the driving member 40 rearward the douser 1 will be returned to its original high magnification position.

Figure 5:
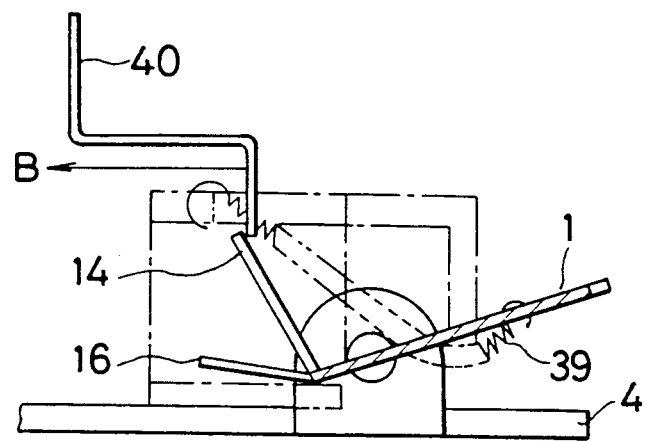
FIG. 5 is a schematic view for explanation of the operation of the apparatus of FIG. 1 showing a correcting operation of a douser to a high magnification projection position.

On the other hand, when the douser 1 is unwillingly moved to the non-light interruption mode (i.e. the high magnification mode) from its light interruption mode (i.e. the low magnification mode), the position of the douser 1 must be also corrected. The correcting operation in this case is also carried out similarly. That is, by moving the driving member 40 rearward, as shown in FIG. 5, it engages the tab 14 and pushes it rearward. The douser 1 is swung to a position slightly beyond the horizontal non-light interruption position against the tension of the spring 39 and the driving member 40 passes over the tab 14. The driving member 40 is thus disengaged from the tab 14 and assumes its normal high magnification position. Then by moving the driving member 40 forward the douser 1 will be returned to its original low magnification position.

According to the apparatus of the present invention it is possible to automatically position the douser 1 for controlling the quantity of marginal light with interlocking with the selection of the magnification. In addition, it is possible to easily return the driving member 40 to its normal position only by continuing the magnification selecting operation thereof even though the douser 1 would be moved to its undesired position due to shock or vibration, for example, during transportation.

What is claimed is:

1. An apparatus for controlling the quantity of light of a copying apparatus wherein the magnification of projection can be varied by the motion of a projection lens comprising;
   a driving member (40) mounted integrally on said projection lens;
   a base plate (4) forming a part of a body of said copying apparatus;
   a douser (1) supported on said base plate (4) around a pivotal shaft arranged at a position offset from an optical axis (2) of said projection lens and orthogonally intersecting the optical axis (2);
   a first tab (14) adapted to be engaged with said driving member (40) when said driving member (40) is moved toward said douser (1) located in a non-light interruption position and a second tab (16) adapted to be engaged with said driving member (40) when said driving member (40) is moved toward said douser (1) located in a light interruption position, said tabs (14 and 16) being formed integrally with said douser (1) on an opposite side of said pivotal shaft of said douser (1) from a side on which light interrupting projections (10 and 12) are formed;
   a tension spring (39) one end of which is secured on one of said light interrupting projections (10 and 12) of said douser (1) and the other end of which is secured on said base plate (4) at a position substantially opposite of said pivotal shaft of said douser (1) from the mid point of the swing angle of said douser (1);
   a positioning portion (31) formed on said base plate (4) adapted to be abutted by said tension spring (39) for holding said douser (1) at said light interruption position;
   a positioning portion (28) formed on said base plate (4) adapted to be abutted by said tension spring (39) for holding said douser (1) at said light non-interruption position; and
   said tab (14) projecting from said side of said douser (1) by a height so that said driving member (40) cannot engage the tab (14) when said douser (1) is swung slightly beyond said light interruption position and said tab (16) projecting from said side of said douser (1) by a height so that said driving member (40) cannot engage the tab (16) when said douser (1) is returned slightly beyond said non-light interruption position.

* * * * *